(12) United States Patent
Zhang et al.

(10) Patent No.: US 10,859,822 B2
(45) Date of Patent: Dec. 8, 2020

(54) LENS, OPTICAL DISPLAY DEVICE AND MANUFACTURING METHOD FOR LENS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xuebing Zhang, Beijing (CN); Dong Chen, Beijing (CN); Hao Zhang, Beijing (CN); Lili Chen, Beijing (CN); Ruijun Dong, Beijing (CN); Chenru Wang, Beijing (CN); Yali Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 197 days.

(21) Appl. No.: 16/074,951

(22) PCT Filed: Dec. 14, 2017

(86) PCT No.: PCT/CN2017/116068
§ 371 (c)(1),
(2) Date: Aug. 2, 2018

(87) PCT Pub. No.: WO2018/130042
PCT Pub. Date: Jul. 19, 2018

(65) Prior Publication Data
US 2019/0041639 A1  Feb. 7, 2019

(30) Foreign Application Priority Data
Jan. 13, 2017 (CN) .......................... 2017 1 0025067

(51) Int. Cl.
*G02B 27/01* (2006.01)
*G02B 13/02* (2006.01)
(Continued)

(52) U.S. Cl.
CPC ........... *G02B 27/0101* (2013.01); *G02B 3/08* (2013.01); *G02B 3/10* (2013.01); *G02B 13/02* (2013.01); *G02B 30/00* (2020.01)

(58) Field of Classification Search
CPC ...... G02B 27/0101; G02B 30/00; G02B 3/10; G02B 13/02; G02B 3/08; G02B 3/00
(Continued)

(56) References Cited

U.S. PATENT DOCUMENTS

| 5,408,281 A | 4/1995 | Zhang |
| 5,798,817 A | 8/1998 | De Carle |

(Continued)

FOREIGN PATENT DOCUMENTS

| CN | 1748170 A | 3/2006 |
| CN | 1918427 A | 2/2007 |

(Continued)

OTHER PUBLICATIONS

Search Report and Written Opinion for International Application No. PCT/CN2017/116068 dated Mar. 16, 2018.
(Continued)

*Primary Examiner* — William R Alexander
*Assistant Examiner* — Henry A Duong
(74) *Attorney, Agent, or Firm* — Calfee, Halter & Griswold LLP

(57) ABSTRACT

A lens, an optical display device including the lens, and a method for manufacturing the lens. The lens includes at least two lens portions; which have different focal lengths. When human eyes view a real scene image through the at least two lens portions separately, the real scene image is imaged at
(Continued)

different image distances. The lens includes different lens portions having different focal lens, and thus can be a multi-focus lens. When the lens is used for an optical display device, the human eyes will see virtual image planes at different distances when viewing a display picture through the different lens portions due to the different focal lengths of the different lens portions. Visual fatigue can be reduced, and also scene images at difference distances can be appropriated, so that the three-dimensional feeling is improved.

18 Claims, 2 Drawing Sheets

(51) Int. Cl.
    *G02B 3/08*     (2006.01)
    *G02B 3/10*     (2006.01)
    *G02B 30/00*     (2020.01)
(58) Field of Classification Search
    USPC ......................................................... 359/742
    See application file for complete search history.

(56) References Cited

U.S. PATENT DOCUMENTS

| | | | |
|---|---|---|---|
| 2005/0135106 A1 | 6/2005 | Kittelmann et al. | |
| 2006/0073231 A1 | 4/2006 | Joe | |
| 2007/0017993 A1* | 1/2007 | Sander | G02B 3/10 235/462.22 |
| 2008/0284977 A1 | 11/2008 | Huang | |
| 2014/0017625 A1 | 1/2014 | Liu et al. | |
| 2014/0063610 A1* | 3/2014 | Murata | B29D 11/00326 359/613 |
| 2015/0160477 A1 | 6/2015 | Dai | |
| 2016/0260258 A1* | 9/2016 | Lo | G06F 3/1423 |
| 2018/0039069 A1 | 2/2018 | Huang et al. | |
| 2019/0339534 A1* | 11/2019 | Yoshida | G02B 6/0031 |

FOREIGN PATENT DOCUMENTS

| | | |
|---|---|---|
| CN | 201075153 Y | 6/2008 |
| CN | 201440171 U | 4/2010 |
| CN | 201584062 U | 9/2010 |
| CN | 201749260 U | 2/2011 |
| CN | 102692730 A | 9/2012 |
| CN | 103607942 A | 2/2014 |
| CN | 204883042 U | 12/2015 |
| CN | 205139459 U | 4/2016 |
| CN | 106501885 A | 3/2017 |
| JP | 03006502 A | 1/1991 |
| KR | 20010084952 A | 9/2001 |
| TW | 219392 B | 1/1994 |

OTHER PUBLICATIONS

First Office Action for Chinese Patent Application No. CN201710025067.4 dated Nov. 24, 2017.
Second Office Action for Chinese Patent Application No. CN201710025067.4 dated Jul. 16, 2018.

* cited by examiner

LENS, OPTICAL DISPLAY DEVICE AND MANUFACTURING METHOD FOR LENS

The present application is the U.S. national phase entry of PCT/CN2017/116068 filed on Dec. 14, 2017, which claims the benefit of Chinese Patent Application No. 201710025067.4 filed on Jan. 13, 2017, of which the entire disclosures of both are incorporated herein by reference.

TECHNICAL FIELD

The present disclosure relates to the field of display technology, in particular to a lens, an optical display device, and a manufacturing method for a lens.

BACKGROUND

In the field of virtual reality (VR), a convex lens is usually used to image pictures presented by a display screen to 25-50 cm in front of human eyes. In this case, since the left and right eyes of a person see different pictures, a stereoscopic effect is generated after processing in brain. This is the principle of binocular stereovision. A conventional convex lens has only one fixed focal length. When they are used in VR devices, they can only image pictures displayed by the screen at a fixed distance. In view of above, while viewing, the user can only focus on the image plane at the fixed distance. In this way, long-term viewing can lead to user's visual fatigue, resulting in dizziness. In addition, in the above mentioned scene, since the pictures viewed by the user are always located at a fixed image plane, the sense of depth and stereo perceived by the user is limited, thereby affecting the user's experience.

SUMMARY

It is an object of the present disclosure to provide a lens, an optical display device including the lens, and a manufacturing method for the lens, in order to solve or at least alleviate one or more of the problems or disadvantages as mentioned above.

According to one exemplary embodiment of the present disclosure, a lens is provided. Specifically, the lens includes at least two lens portions having different focal lengths. In this case, when human eyes look at a live image through the at least two lens portions respectively, the live image can be imaged at different image distances.

Further, the above described lens includes a first surface and a second surface disposed oppositely, where the first surface and the second surface are both circular. Specifically, the first surface is flat, and the second surface includes a plurality of annular grooves, where dentations are formed between two adjacent annular grooves, and dentations corresponding to different lens portions have different structural parameters. In this way, the at least two lens portions will have different focal lengths. In certain exemplary embodiments, in the above described lens, the plurality of annular grooves is disposed concentrically.

Further, the structural parameters of the dentations include at least one of: spacings between two adjacent annular grooves, heights of different dentations in a direction perpendicular to the first surface, and angles between side-faces of the dentations and the first surface.

Further, in a specific embodiment, the above described lens includes a first lens portion and at least one second lens portion. Specifically, the first lens portion and the second lens portion are disposed concentrically, and the second lens portion is disposed to surround the first lens portion.

Further, in a specific example, the first lens portion includes at least two sets of the dentations, and the second lens portion includes at least two sets of the dentations as well.

Further, in another embodiment, each of the at least two lens portions includes a sector lens portion. Specifically, all the sector lens portions are disposed concentrically, and the structural parameters include at least one of: heights of the dentations in a direction perpendicular to the first surface, and angles between side-faces of the dentations and the first surface.

Further, in another specific example, each sector lens portion has the same central angle. In certain exemplary embodiments, the same central angle as mentioned above is 180°.

According to another exemplary embodiment of the present disclosure, an optical display device is further provided. The optical display device includes: a display screen; and a lens as described in any of the above embodiments, where the lens is disposed at a display side of the display screen.

Further, in a specific embodiment, the above described lens includes a left-eye lens or a right-eye lens, where the left-eye lens is configured for left-eye viewing and the right-eye lens is configured for right-eye viewing.

Further, in another embodiment, the display screen includes at least two display areas, and the at least two display areas correspond to the at least two lens portions of the lens respectively. In addition, the at least two display areas are also configured to display images at different preset ratios and at different preset image distances.

According to yet another exemplary embodiment of the present disclosure, a manufacturing method for the above described lens is also provided. Specifically, the manufacturing method includes forming the above described lens by an injection molding process with a polyolefin material.

DETAILED DESCRIPTION OF THE EMBODIMENTS

Figure 1:
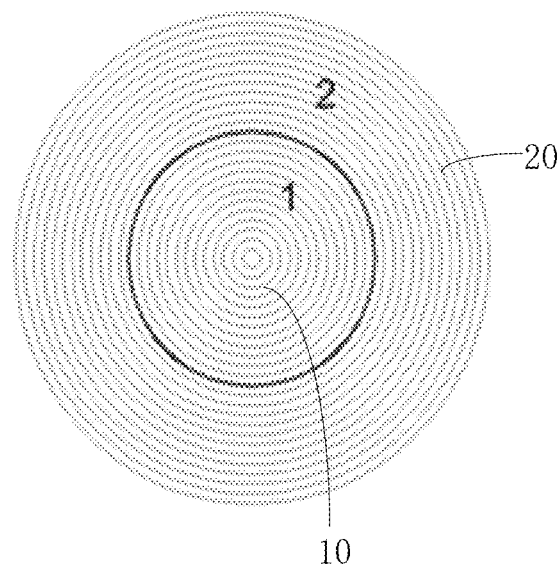
FIG. 1 illustrates a structural schematic diagram of a lens according to an embodiment of the present disclosure.

In order to illustrate objects, technical solutions and advantages of the present disclosure more clearly, in the following the technical solutions in the embodiments of the present disclosure will be described clearly and completely with reference to the drawings in the embodiments of the present disclosure. Obviously, the described embodiments are only part of the embodiments of the present disclosure, and not all of the embodiments. Based on the embodiments in the present disclosure, all other embodiments obtained by those of ordinary skills in the art pertain to the protection scope of the present disclosure.

In an embodiment of the present disclosure, a lens is provided. The lens includes at least two lens portions having different focal lengths. In this way, when human eyes look at a live image through the at least two lens portions respectively, the live image can be imaged at different image distances.

As can be seen, the lens provided in the present disclosure includes different lens portions having different focal lengths, and thus belongs to a multifocal lens. In this case, when human eyes look at a live image through the lens, the live image can be imaged at different image distances. Thus, in the case where the lens is used in an optical display device such as a virtual reality device, if human eyes look at the display image of the display screen through different lens portions, the virtual image planes seen by the human eyes will be at different distances, because the focal lengths of different lens portions are different. In this way, by looking at the virtual image planes at different distances, the user's visual fatigue during long-term viewing can be alleviated. At the same time, the user can experience scene images at different distances, thereby enhancing the stereoscopic effect.

It should be noted that the lenses provided herein are not only limited to use in virtual reality devices, but also can be applied to other devices. The present disclosure is not limited in this exemplary embodiment.

In alternative embodiments of the present disclosure, the above described lens can be obtained by modifying a conventional Fresnel lens appropriately.

Compared to conventional spherical lenses and aspheric lenses, Fresnel lenses can achieve a large field of view with a small thickness and volume. Therefore, the lens according to embodiments of the present disclosure can be obtained by modifying a conventional Fresnel lens appropriately. Of course, it will be appreciated that the lenses proposed herein can also be formed using spherical or aspherical lenses, and the present disclosure is not limited to conventional Fresnel lenses.

Conventional Fresnel lenses have a fixed focal length. Due to this, in the case where the display image of the display screen is imaged at a predetermined distance in front of human eyes, if the object distance (i.e., the distance from the display screen to the Fresnel lens) is $L_1$, the focal length of the Fresnel lens is f, and the image distance (the distance from the virtual image plane to the Fresnel lens) is $L_2$ (since it is a virtual image, $L_2$ is a negative value), the following imaging formula is satisfied:

$$\frac{1}{L_1} + \frac{1}{L_2} = \frac{1}{f}.$$

Thus, in the case where the object distance $L_1$ is fixed, if the focal length f of the Fresnel lens changes, the image distance $L_2$ also changes. Correspondingly, if a conventional Fresnel lens is specially designed to include multiple portions with different focal lengths (also referred to as multiple lens portions herein), different lens portions with different focal lengths will image the display image of the display screen at different distances respectively.

It should be noted that for a conventional Fresnel lens having a fixed focal length, one surface is smooth and the other surface has equidistant dentations. Specifically, such dentations can be designed based on interference and diffraction of light, as well as the corresponding requirements for sensitivity and receiving angle.

In an alternative embodiment of the present disclosure, by modifying a conventional Fresnel lens, the lens includes a circular first surface and a circular second surface disposed oppositely. Specifically, the first surface is a flat surface, and the second surface includes a plurality of annular grooves, where dentations are formed between two adjacent annular grooves. It can be understood that bulges can be formed between two annular grooves, and the dentations are saw-toothed structures in cross-portions perpendicular to the circumferential direction of the annular groove. Further, the structural parameters of the dentations corresponding to different lens portions are different, which enables different lens portions to have different focal lengths.

In the above solution, the focal lengths of different lens portions can be made different by selecting the structural parameters of the dentations for different lens portions. Specifically, the structural parameters of the dentations include, for example the spacing between two adjacent annular grooves, heights of different dentations in a direction perpendicular to the first surface, and angles between side-faces of the dentations and the first surface. Obviously, those skilled in the art will appreciate that the structural parameters of the dentations are not limited to those specific examples listed above, and any other suitable structural parameters can also be selected.

It should be noted that in the lens provided by the present disclosure, the first surface is in particular a smooth surface. This means that the first surface can be a smooth plane or a smooth curved surface, such as a spherical or aspherical surface.

Two alternative embodiments of the lenses provided by the present disclosure are described below.

Referring to FIG. 1, a structural schematic diagram of a lens according to an embodiment of the present disclosure is illustrated.

As shown in FIG. 1, in an embodiment, the lens is a circular lens, and includes a first lens portion and at least one second lens portion, in this example, in particular, one second lens portion. Specifically, the first lens portion, also referred as the first lens portion 1, is a circular lens portion which is located at the center of the entire lens. Correspondingly, the second lens portion, also referred as the second lens portion 2, is an annular region which is distributed around the first lens portion 1.

In the above solution, the entire lens can have a circular structure and be divided into different lens portions disposed from the inside out. Specifically, one lens portion (i.e., the first lens portion 1) is located at the center of the entire lens, and the other lens portion (in this example, the second lens portion 2) surrounds the first lens portion 1. It should be noted here that although only one annular lens portion is shown in FIG. 1, the present disclosure is not limited thereto. That is, in other examples, the lens can also include more second annular lens portions. In such a case, these annular lens portions will surround the first lens portion 1 sequentially from the inside out.

In certain exemplary embodiments the first lens portion 1 includes at least two sets of dentations 10, where each set of dentations 10 is in a complete ring shape. Further in certain exemplary embodiments, the second lens portion 2 includes at least two sets of dentations 20, where each set of dentations 20 is also in a complete ring shape. Obviously, all dentations 20 surround all dentations 10, and are disposed concentrically with the dentations 10.

It should be noted that in the above embodiment as shown in FIG. 1, there is only one second lens portion 2 (i.e., the entire lens includes two different lens portions, the first lens portion 1 and the second lens portion 2). However, in other embodiments of the present disclosure, the lens can further include a plurality of second lens portions 2, and the plurality of second lens portions 2 are sequentially disposed to surround the first lens portion 1 concentrically. In addition, each second lens portion 2 also includes at least two sets of dentations 20. In this way, a plurality of lens portions 1, 2 having different focal lengths are formed from inside out over the entire lens.

It should also be noted that in the above embodiment, the lens can be formed by injection molding process using a polyolefin material. Of course, it can be understood that the lens according to embodiments of the present disclosure can be manufactured by other specific processes, and the present disclosure is not limited thereto.

Figure 2:
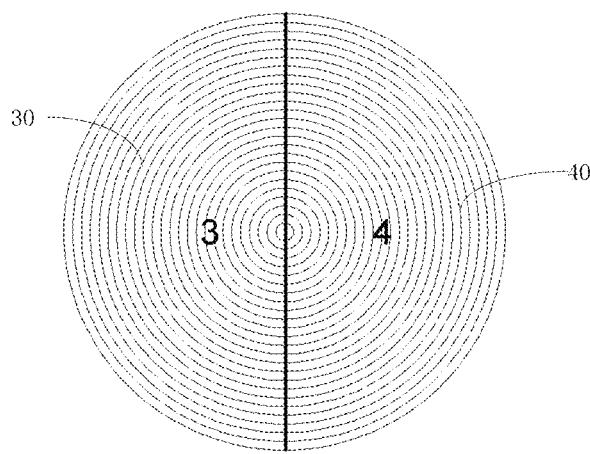
FIG. 2 illustrates a structural schematic diagram of a lens according to another embodiment of the present disclosure.

Referring to FIG. 2, a structural schematic diagram of a lens according to another embodiment of the present disclosure is illustrated.

In this embodiment, the lens is also a circular lens. However, unlike the previous embodiment, each lens portion of the lens is a sector. In addition, each of the sector lens portions is disposed concentrically.

According to the above solution, the entire lens can be divided into a plurality of sector portions, thus forming different lens portions. In such a case, the dentations in each sector lens portion will be distributed in arcs. In particular, the arcs of dentations in all sector lens portions can also be connected, and form a complete ring eventually.

In certain exemplary embodiments, each sector lens portion has the same central angle, and includes the same number of arcs of dentations. In particular, each sector lens portion has a central angle of 180°. This means that the entire circular lens can be divided into two semicircular lens portions, i.e., including two semicircular lens portions.

In the following, this embodiment will be described by taking the lens divided into two different lens portions as an example.

In certain exemplary embodiments as shown in FIG. 2, the entire lens includes a semicircular first lens portion 3 and a semicircular second lens portion 4. In addition, the first lens portion 3 includes a first dentation 30 distributed in a 180° arc. Similarly, the second lens portion 4 also includes a second dentation 40 distributed in a 180° arc. In particular, each arc of first dentation 30 also meets a corresponding arc of second dentation 40 to form a complete ring.

In the above solution, as an example, the entire lens is divided into two different lens portions. Specifically, the entire lens is divided into two semicircular portions to form different lens portions. In such a case, the dentation in each semicircular lens portion will be distributed in an arc of 180°, and the dentations in the two semicircular lens portions will be further connected to form a complete ring.

It should be noted that in the above embodiment, the lens can be formed by injection molding process using a polyolefin material. Of course, it can be understood that the lens according to embodiments of the present disclosure can be manufactured by other specific processes, and the present disclosure is not limited thereto.

It should also be noted that in actual applications, the entire lens can also be divided into different numbers of lens portions according to specific requirements, and the specific division manner can also be flexibly selected according to requirements.

According to another exemplary embodiment of the present disclosure, an optical display device is provided. Such an optical display device includes: a display screen 100; and a lens 200 as described in any of the above embodiments, where the lens is disposed at a display side of the display screen 100.

In a specific embodiment, the optical display device can be a virtual reality device, and can also be other suitable optical display devices. In this case, the lenses have different lens portions of different focal lengths, thereby forming a multifocal lens. Since the focal lengths of different lens portions are different, when human eyes look at the display image of the display screen through different lens portions, the virtual image planes seen by the human eyes will be at different distances. In this way, by looking at the virtual image planes at different distances, the user's visual fatigue during long-term viewing can be alleviated. At the same time, the user can experience scene images at different distances, thereby enhancing the stereoscopic effect.

In certain exemplary embodiments, in the optical display device provided by the present disclosure, the lens can include a left-eye lens or a right-eye lens. I.e., the lens can be configured for left-eye viewing or right-eye viewing.

In the above solution, according to the principle of binocular stereovision, when the left and right eyes of a person look at the lens portions with the same focal length in the left and right eye lenses simultaneously, the picture presented by the display screen will be imaged to a predetermined distance in front of human eyes. In this case, since the left and right eyes of the person see different pictures, a stereoscopic effect is generated after processing in brain.

Figure 3:
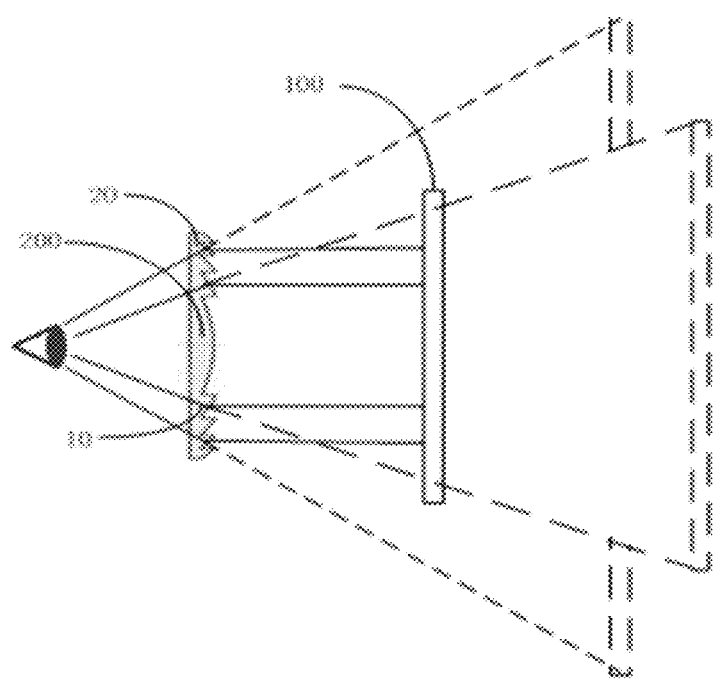
FIG. 3 illustrates a structural schematic diagram of an optical display device according to an embodiment of the present disclosure.

Due to different focal lengths of different lens portions, the magnification ratios of the virtual images observed by the human eyes through different lens portions will also be different. That is, when the user looks at the display image of the display screen through different lens portions, there can be a difference in image size. As shown in FIG. 3, the display device lens 200 includes a circular lens portion 10 located at the center and an annular lens portion 20 disposed around the circular lens portion 10, as shown in FIG. 1. Specifically, FIG. 3 shows an image seen by the human eyes through the circular lens portion 10 and the annular lens portion 20, where the image is presented at different image distances by different areas in the corresponding display screen 100. Based on this, the difference in image size can be weakened by reducing the difference in focal length of different lens portions. However, when the image size is greatly different, it is likely to reduce the user experience.

In order to solve the above technical problem, in certain exemplary embodiments of the present disclosure, the display screen 100 includes at least two display areas which are in one-to-one correspondence with at least two lens portions of the lens 200. Specifically, the at least two display areas are designed to display images at different preset ratios and at different preset image distances. This means that when human eyes look at the display screen 100 through the at least two lens portions, images will be scaled at different preset ratios by different display areas of the display screen 100 to be imaged in the same size for the user at different image distances.

In the above solution, by dividing the display screen 100 into different display areas corresponding to different lens portions of the lens 200, human eyes can only see the display image in the display area corresponding thereto through each lens portion.

Specifically, in the above embodiment, images displayed by different display areas will have different sizes (i.e., different display areas display at different predetermined ratios). For example, if the magnification ratio of the lens portion is large, the display area corresponding to the lens portion can be controlled to display the image at a smaller magnification. Accordingly, if the magnification ratio of the lens portion is small, the display area corresponding to the lens portion can be controlled to display the image in a larger magnification. In this way, when human eyes look at the display screen 100 through different lens portions of the lens 200, different display areas of the display screen 100 will magnify the images at different preset ratios. In particular, different preset ratios for different display areas are selected, so that although images viewed through different lens portions are imaged at different image distances, the image size can still be approximately the same. Thus, when switching between different lens portions to see an image, the final displayed image size will not change significantly for the user, thereby further improving the user experience.

Of course, it can be understood that, depending on the requirements under different occasions, different preset ratios for different display areas can also select other values, as long as the final displayed image can be basically the same size for the user.

In addition, according to other exemplary embodiments of the present disclosure, a manufacturing method for the above lens 200 is further provided. Specifically, the manufacturing method includes forming the lens 200 by an injection molding process with a polyolefin material. Thus, the lens 200 can be obtained in a relatively simple manufacturing process.

The above is only preferred implementations of the present disclosure. It should be noted that those skilled in the art can make several modifications and substitutions without departing from the technical principle of the present disclosure. All these modifications and substitutions should pertain to the protection scope of the present disclosure.

The invention claimed is:

1. A lens, comprising at least two lens portions having different focal lengths, wherein the lens comprises a first surface and a second surface disposed oppositely, wherein the first surface and the second surface are both circular, wherein the first surface is flat, and the second surface comprises a plurality of annular grooves, comprising dentations formed between two adjacent annular grooves of the plurality of annular grooves, and the dentations formed between the at least two lens portions comprise different structural parameters.

2. The lens according to claim 1, wherein the plurality of annular grooves is disposed concentrically.

3. The lens according to claim 2, wherein the structural parameters of the dentations comprise at least one of: spacings between the two adjacent annular grooves, heights of different dentations in a direction perpendicular to the first surface, or angles between side-faces of the dentations and the first surface.

4. The lens according to claim 2, wherein the at least two lens portions comprise a first lens portion and at least one second lens portion, wherein
the first lens portion and the at least one second lens portion are disposed concentrically; and
the at least one second lens portion is disposed to surround the first lens portion.

5. The lens according to claim 4, wherein
the first lens portion comprises at least two sets of the dentations;
each of the at least one second lens portion comprises at least two sets of the dentations.

6. The lens according to claim 2, wherein each of the at least two lens portions comprises a sector lens portion, all the sector lens portions are disposed concentrically, and the structural parameters comprise at least one of: heights of the dentations in a direction perpendicular to the first surface, and angles between side-faces of the dentations and the first surface.

7. The lens according to claim 6, wherein the sector lens portion has a same central angle.

8. The lens according to claim 7, wherein the same central angle is 180°.

9. An optical display device, comprising:
a display screen; and
a lens according to claim 1, wherein the lens is disposed at a display side of the display screen.

10. The optical display device according to claim 9, wherein the display screen comprises at least two display areas corresponding to the at least two lens portions of the lens respectively, wherein the at least two display areas display images at different preset ratios and at different preset image distances.

11. The optical display device according to claim 10, wherein the lens comprises a left-eye lens or a right-eye lens, wherein the left-eye lens is used for left-eye viewing, and the-right eye lens is used for right-eye viewing.

12. The optical display device according to claim 9, wherein the lens comprises a left-eye lens or a right-eye lens, wherein the left-eye lens is used for left-eye viewing, and the-right eye lens is used for right-eye viewing.

13. The optical display device according to claim 9, wherein the lens comprises a first surface and a second surface disposed oppositely, wherein the first surface and the second surface are both circular, wherein the first surface is flat, and the second surface comprises a plurality of annular grooves, wherein dentations are formed between two adjacent annular grooves of the plurality of annular grooves, and
the dentations comprised by different lens portions have different structural parameters.

14. The optical display device according to claim 13, wherein the plurality of annular grooves is disposed concentrically.

15. The optical display device according to claim 14, wherein the structural parameters of the dentations comprise at least one of: spacings between the two adjacent annular grooves, heights of different dentations in a direction perpendicular to the first surface, and angles between side-faces of the dentations and the first surface.

16. The optical display device according to claim 14, wherein the lens comprises a first lens portion and at least one second lens portion, wherein
the first lens portion and the at least one second lens portion are disposed concentrically; and
the at least one second lens portion is disposed to surround the first lens portion.

17. The optical display device according to claim 14, wherein each of the at least two lens portions comprises a sector lens portion, all the sector lens portions are disposed concentrically, and the structural parameters comprise at least one of: heights of the dentations in a direction perpendicular to the first surface, and angles between side-faces of the dentations and the first surface.

18. A manufacturing method for a lens according to claim 1, comprising forming the lens by an injection molding process with a polyolefin material.

* * * * *

UNITED STATES PATENT AND TRADEMARK OFFICE
CERTIFICATE OF CORRECTION

PATENT NO. : 10,859,822 B2
APPLICATION NO. : 16/074951
DATED : December 8, 2020
INVENTOR(S) : Xuebing Zhang et al.

Page 1 of 1

It is certified that error appears in the above-identified patent and that said Letters Patent is hereby corrected as shown below:

On the Title Page

Please switch the order of the Applicants in item (71) to read as follows:
BEIJING BOE OPTOELECTRONICS TECHNOLOGY CO., LTD., Beijing (CN)
BOE TECHNOLOGY GROUP CO., LTD., Beijing (CN)

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*